US00RE38610E1

(19) United States
(12) Reissued Patent
Lum et al.

(10) Patent Number: US RE38,610 E
(45) Date of Reissued Patent: Oct. 5, 2004

(54) HOST CPU INDEPENDENT VIDEO PROCESSING UNIT

(75) Inventors: Sanford S. Lum, Scarborough (CA); Keping Chen, Mississauga (CA); Samuel L. C. Wong, Thornhill (CA); Dwayne R. Bennett, Scarborough (CA); Michael A. Alford, Ajax (CA)

(73) Assignee: ATI Technologies, Inc., Thornhill (CA)

(21) Appl. No.: 09/637,824

(22) Filed: Aug. 11, 2000

Related U.S. Patent Documents

Reissue of:
(64) Patent No.: 5,793,445
Issued: Aug. 11, 1998
Appl. No.: 08/667,872
Filed: Jun. 20, 1996

U.S. Applications:

(63) Continuation of application No. 08/129,355, filed on Sep. 30, 1993, now abandoned.

(51) Int. Cl.[7] ..... H04N 5/262
(52) U.S. Cl. ..... 348/720; 348/598; 348/578
(58) Field of Search ..... 348/720, 598, 348/578, 547, 581, 582, 453; 340/629, 660

(56) References Cited

U.S. PATENT DOCUMENTS

| | | | | | |
|---|---|---|---|---|---|
| 4,864,496 | A | * | 9/1989 | Triolo et al. | 364/200 |
| 4,980,765 | A | * | 12/1990 | Kudo et al. | 358/160 |
| 4,994,912 | A | * | 2/1991 | Lumelsky et al. | 358/140 |
| 5,020,115 | A | * | 5/1991 | Black | 382/44 |
| 5,105,266 | A | * | 4/1992 | Telle | 358/80 |
| 5,124,688 | A | * | 6/1992 | Rumball | 340/203 |
| 5,227,863 | A | * | 7/1993 | Bilbrey et al. | 358/22 |
| 5,243,447 | A | * | 9/1993 | Bodenkamp et al. | 345/133 |
| 5,260,695 | A | * | 11/1993 | Gengler et al. | 345/153 |
| 5,444,835 | A | * | 8/1995 | Turkowski | 395/135 |
| 5,889,499 | A | * | 3/1999 | Nally et al. | 345/7 |

* cited by examiner

*Primary Examiner*—Victor R. Kostak
(74) *Attorney, Agent, or Firm*—Sterne, Kessler, Goldstein & Fox P.L.L.C.

(57) ABSTRACT

The present invention relates to a video display processor comprised apparatus for receiving digital input signal components of a signal to be displayed, apparatus for converting the components to a desired format, apparatus for scaling and blending the signals in the desired format, apparatus for outputting the scaled and blended signals for display or further processing, and an arbiter and local timing apparatus for controlling the apparatus substantially independently of a host CPU.

7 Claims, 5 Drawing Sheets

HOST CPU INDEPENDENT VIDEO PROCESSING UNIT

Matter enclosed in heavy brackets [ ] appears in the original patent but forms no part of this reissue specification; matter printed in italics indicates the additions made by reissue.

This is a continuation of application Ser. No. 08/129,355 filed Sep. 30, 1993 now abandoned.

FIELD OF THE INVENTION

This invention relates to a video display processor for desktop computers processing multi-media signals.

BACKGROUND TO THE INVENTION

Computer multi-media signal processing involves combining and manipulating graphical and video images, the video images involving high data rates, particularly for moving images. Such systems are typically required to convert signals of the form received from a TV station, usually in a YVU or YCrCb color model, to RBG, the form usually used by a computer display, or vice versa, while adjusting brightness and correcting for color. They are required to perform blends, and scale the signals (stretch and/or contract) for the display, so that for example different sized video images can be superimposed in separate different sized windows. The typical host CPU of a computer system is hard-pressed to service these requirements in real time, and at the same time maintain service to other computer peripherals and devices.

For example, graphical stretches and reductions previously tended to be software implementations, and were application specific. However these are unsuitable for stretching or reducing live video images, due to the intensity of use of the computer CPU, creating a large overhead. In order to minimize CPU overhead, hardware scalers were produced. However these were typically used in digital to analog converters which translate the output of the graphics or display circuit immediately previous to the display. These scalers have only been able to scale upwards to multiples of the image source size. Further, since the output of the scaler is an analog signal suitable for the display, the image signals could only be displayed, and could not be read back digitally or operated on again.

Display processors for desktop computers were in the past able to superimpose one object upon another, for example the display of a cursor over background graphics. Such a processor typically incorporates a destination register, which stores pixel data relating to pixels to be displayed. Such data is often referred to as destination data. Other pixel data, to be superimposed (i.e. mixed) over the destination data, is stored in a source register and is referred to source data. A computer program controls software comparisons of the pixel values, and selects for display the pixel value having either a component or a value which is in excess of the corresponding value of the destination pixel.

While such an operation has been successful for graphical data, even graphical data with a varying component, such as data which varies due to a moving cursor, it has not been very successful to provide a rich array of capabilities when video data is to be mixed with video data or with graphics data. Yet these capabilities have become increasingly important as multimedia demands are made on the desktop computer. One of the primary reasons for the inability to provide such capabilities is that with software comparisons, excessive interrupt and processing demands are made on the central processor, which inhibits it from servicing the remainder of the computer in a timely fashion.

A description of software processing of pixel data, including mixing of graphical data, may be found in the text "Graphics Programming For the 8514/A", by Jake Richter and Bud Smith, M&T Publishing, Inc., Redwood City, Calif., copyright 1990, and which is incorporated herein by reference.

SUMMARY OF THE INVENTION

In order to solve this problem, a separate graphics processor system has been designed, containing a video subsystem. Except for the loading of a video memory which interfaces the video subsystem, the present invention operates independently of the host CPU, thus greatly relieving it of major operational overhead. It can thus service the remainder of the system, increasing its response time. Yet full motion processed multi-media signals can be provided on a computer using the present video subsystem invention.

In accordance with the present invention a video display processor is comprised of apparatus for receiving digital input signal components of a signal to be displayed, apparatus for converting the components to a desired format, apparatus for scaling and blending the signals in the desired format, apparatus for outputting the scaled and blended signals for display or further processing and an arbiter and local timing apparatus for controlling all of the apparatus substantially independently of a host CPU.

BRIEF INTRODUCTION TO THE DRAWINGS

A better understanding of the invention will be obtained by a consideration of the detailed description below of a preferred embodiment, in conjunction with the following drawings, in which.

Figure 5:
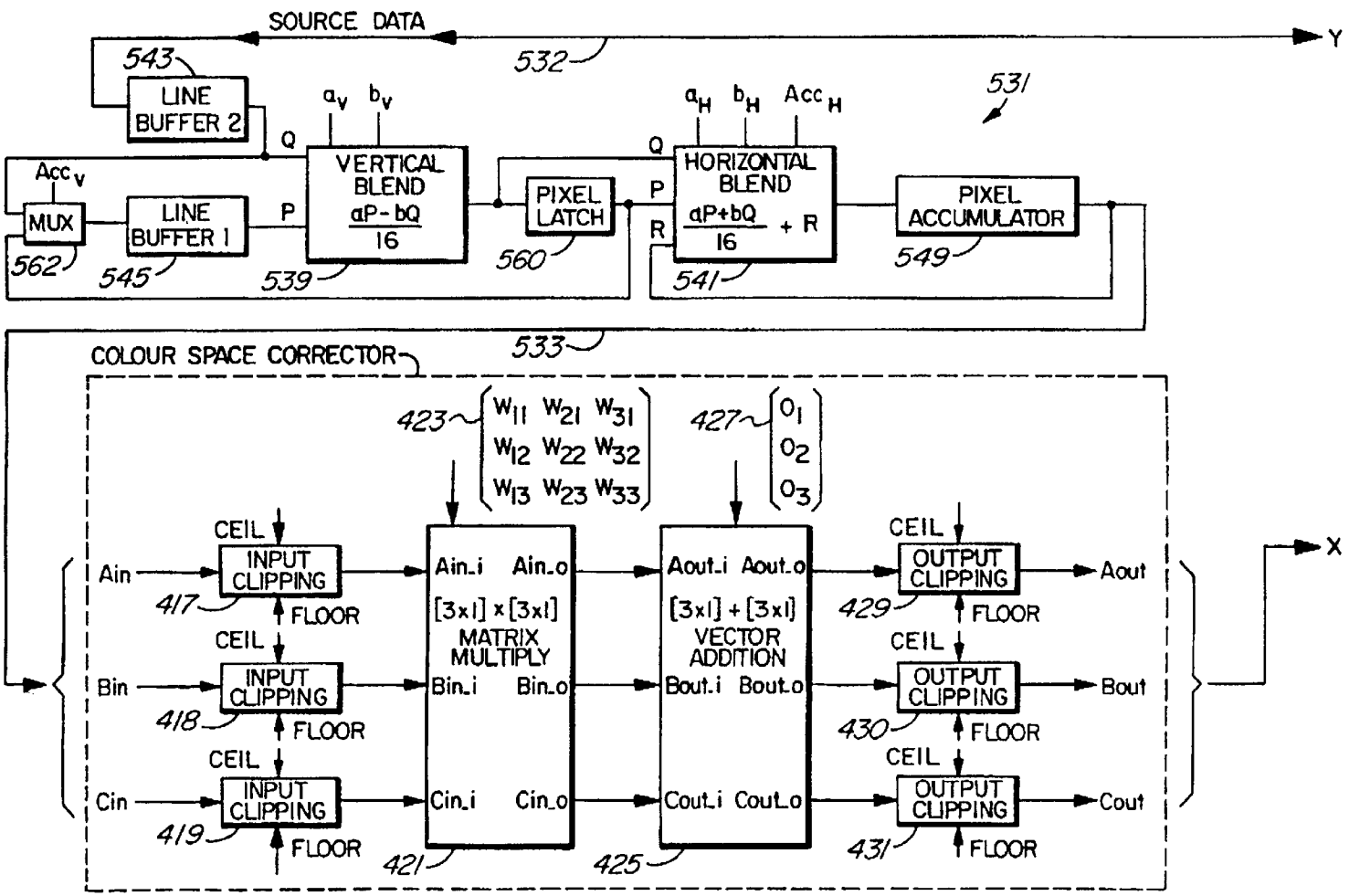
Figure 6:
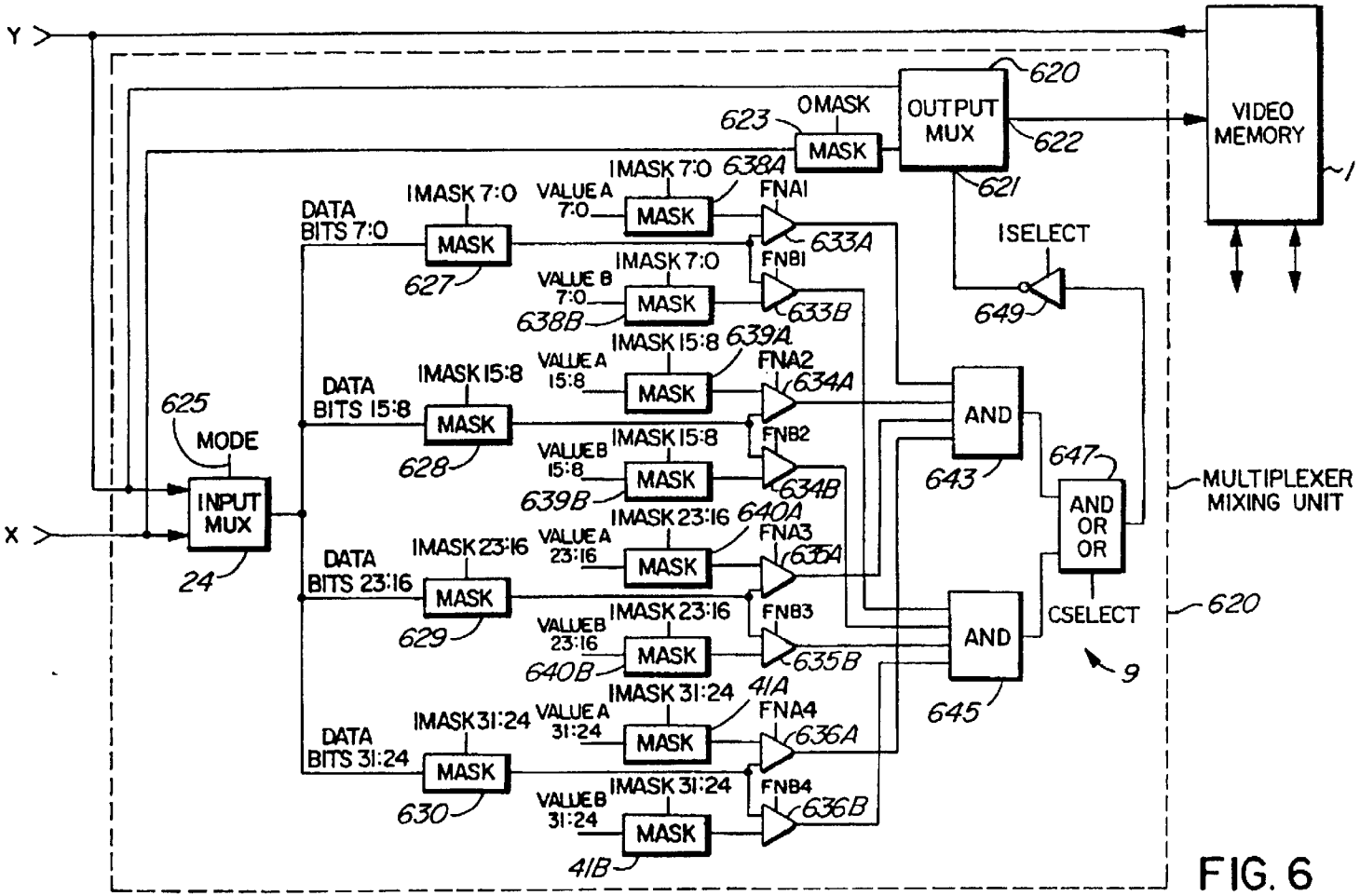

FIGS. 5 and 6 placed together illustrate a detailed block diagram of the invention.

Figure 7:
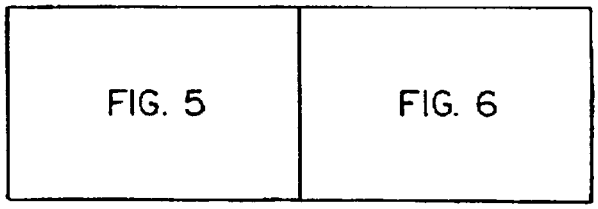

FIG. 7 illustrates how FIGS. 5 and 6 should be placed together, and

Figure 8:
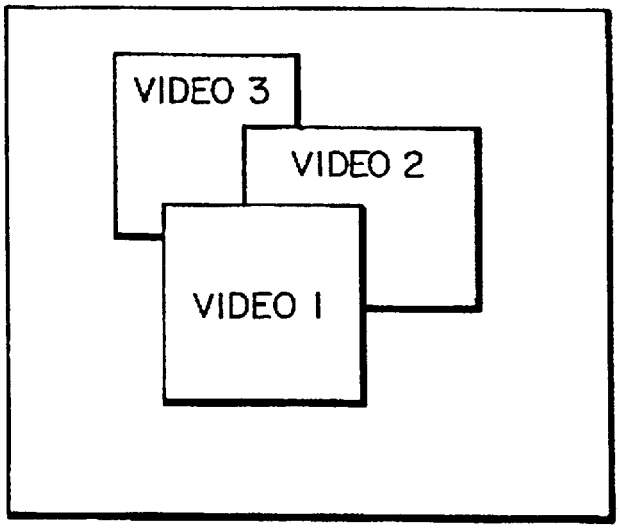

FIG. 8 illustrates a computer display result from use of the invention.

DETAILED DESCRIPTION OF THE INVENTION

Figure 1:
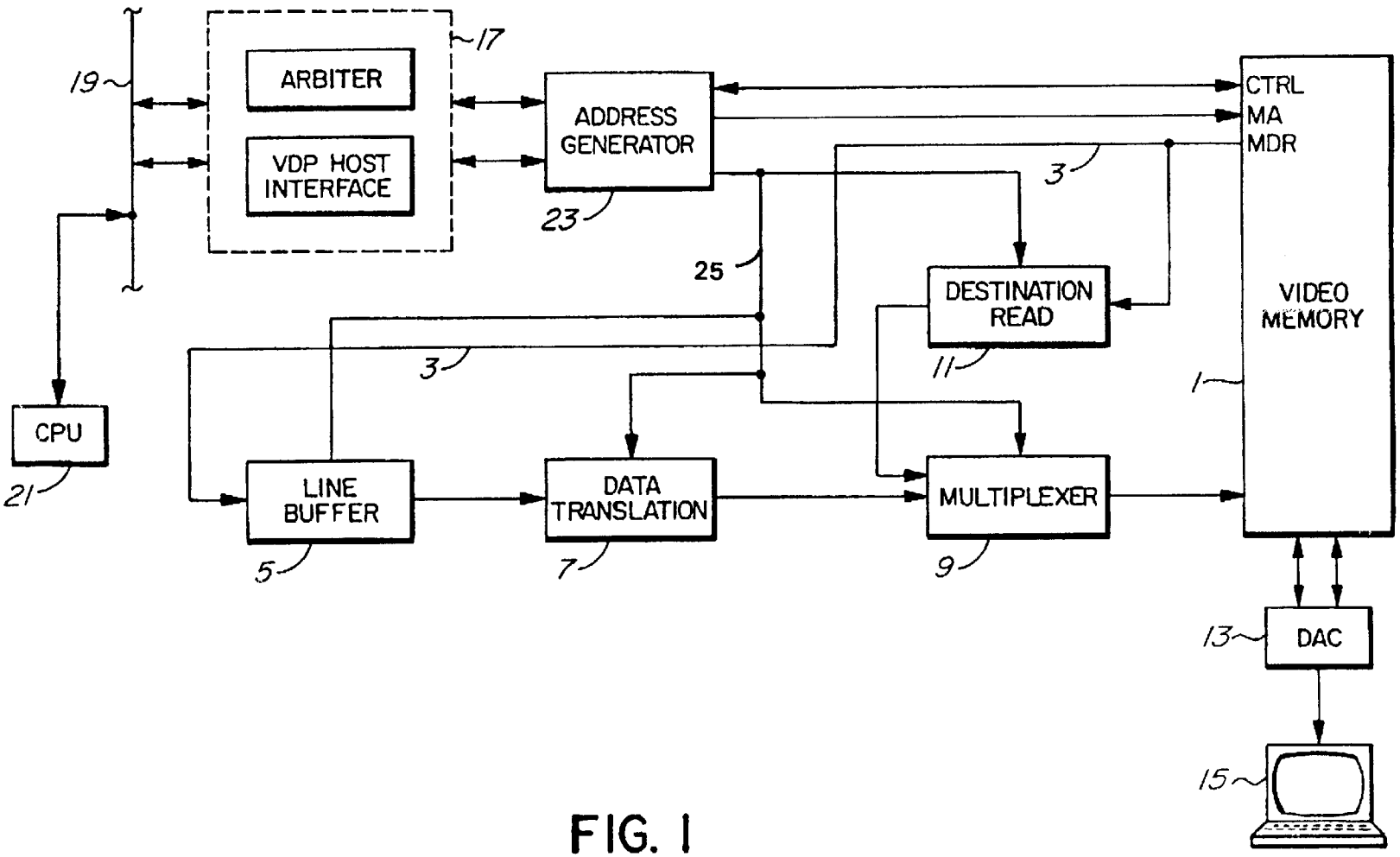
FIG. 1 is a block diagram of a preferred embodiment of the invention.

FIG. 1 illustrates the invention in basic block form. Digital signals which conform to a particular color model, such as RGB or YVU are stored in video memory 1, and are applied via high speed bus 3 to a line buffer 5. Signals from line buffer 5 are applied to a data translator circuit 7, which performs the functions to be described below. The output signal from the data translator circuit 7, referred to herein as a processed source signal, is applied to a multiplexer 9. Also applied to multiplexer 9 is a destination signal, read from the memory 1 by a destination signal read circuit 11. The multiplexer 9 multiplexes the processed source and destination signals, and produces an output signal which is stored in memory 1 for further processing, or for translation via digital to analog converter 13 and for display on display 15.

A destination read interface circuit 11 (comprising e.g. a FIFO and a data unpacker) reads destination data from memory 1 and provides it to multiplexer 9.

Timing and control of the parts of the data translator 7, destination read circuit and multiplexer, as well as the reading of the memory 1 to read source data, for providing the signals to buffer 5 is provided by arbiter and host CPU interface 17. These elements interface a main computer bus 19, such as an ISA bus, to which the main CPU 21 of the computer is connected. The interface connects to the arbiter, which receives signals from and sends signals to the CPU 21. Arbiter signals are generated in arbiter 17 for each of the units 7, 9 and 11 to control their operation, and causes an address generator 23 to generate appropriate addresses for each of the units 7, 9 and 11 to complete control signals for unit 7, 9 and 11.

Further, CPU 21 establishes virtual connections between the units 7, 9 and 11 by sending signals via host interface 17 to memory 1 to set up a parameter list which defines the required operation (such as a color-space transformation, or a scaling of an image), and assigns specific trigger codes to that parameter list. There may be any number of virtual connections for any given process. Once all the virtual connections have been set up, the system operates independently of the CPU 21, thus relieving it from the video control, and allowing it to deal with other computer processes.

The system described herein triggers operation of the various units by sending a specific trigger code assigned to that operation, via a control bus 25. When any unit receives a trigger code, it locates the parameter list assigned to that specific message, and then performs the operation as defined in that parameter list. All this is performed independently of the computer CPU 21.

Parameter lists may be linked together, so that one trigger code can trigger a number of operations. Furthermore, as parameter lists exist in shared memory 1 and their structure is defined to all components, parameters can be altered concurrently with a process.

Preferably the control bus uses a serial bus protocol to facilitate event synchronization between components in a multi-media computing environment. Each device on the bus has an opportunity to transmit a preferably 16 bit message to the other devices on the bus.

The bus requires only two pins on each device to implement: clock and data. The arbiter provides a stable clock and polls for requests from all devices connected to the bus. Polling for requests is accomplished by transmitting a series of "invitations"; one for each of the devices (addressed by ID number) on the bus 25. While only one arbiter is required, any of the devices could be made capable of performing the function, by using appropriate circuitry.

The arbiter constantly cycles through a series of invitations to allow each device on the bus 25 to use a brief time slot for signalling other components in the system. An invitation begins with a start bit and is followed by a device ID signal—an "invitation to send". All devices receive the ID signal and decode its value. The device that matches the invitation ID can then choose to accept the invitation by asserting an invitation acknowledge bit into the bit stream. Following the invitation acknowledge bit, the selected device then broadcasts its signal event which represents some form of status or message. The significance of these messages is decoded by all devices on the bus 25 and 18 acted upon by the appropriate target device(s). The arbiter cycles through all of the device IDs that are connected so that each device has an opportunity to broadcast a message. Messages or "signal events" are preferably 16 bit fields containing a 4 bit function code and a 12 bit data field.

Figure 2:
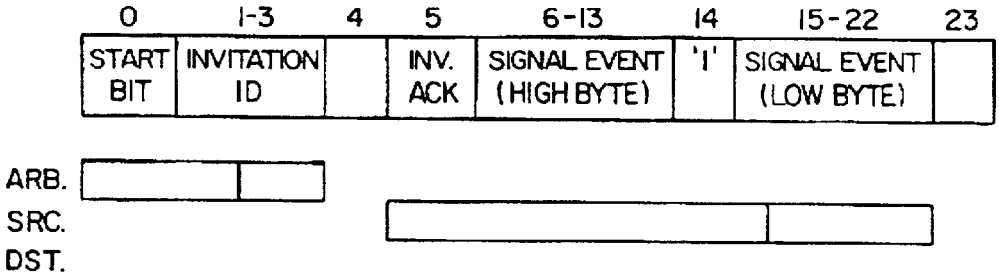
FIG. 2 illustrates a first form of signal packet carried by a control bus used in the preferred embodiment of the invention.

A typical data packet, as shown in FIG. 2, begins when the arbiter transmits an invitation composed of a start bit (bit 0) followed by a 3 bit invitation ID (bits 1–3). It then should release the bus on cycle 4 leaving the bus in the de-asserted state. The device with matching ID then should take over the bus and assert an invitation acknowledge (bit 5) to indicate that it will commence transmission of the signal event. The sequence is depicted in the time bar chart below the packet example.

Figure 3:
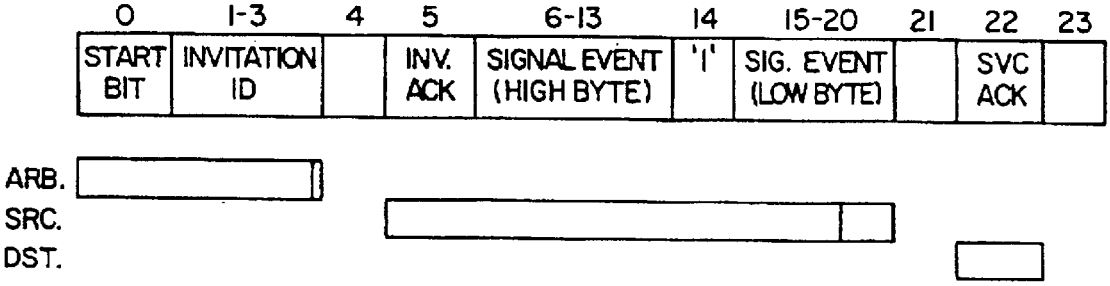
FIG. 3 illustrates a second form of signal packet.

With respect to FIG. 3, in some cases a signal event from the invited source requires an acknowledgment from the destination or target of the signal event. In this case the service acknowledge signal should be driven from the target at bit location 22. Bit 21 is then used as a switchover time duration for the source of the signal event to release the bus to the target. Acknowledgment of a service request is required since devices may have very limited (or no) queuing capabilities. A true acknowledge ('1') then indicates that the target of the service request either has room in its request queue or it isn't busy performing a service and can therefore accept another request. When a request isn't acknowledged, the requester can retry each time it is invited to use the bus until the request is acknowledged.

Figure 4:
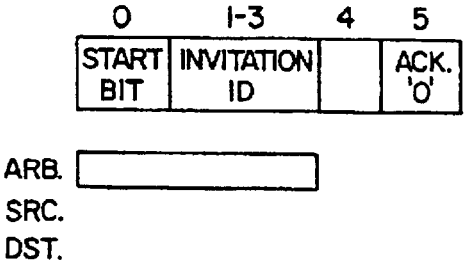
FIG. 4 illustrates a third form of signal packet.

Most of the time the bus 25 will contain only circulating invitations from the arbiter with no device actually accepting the invitations. In these cases the Signal Event portion of the packet is skipped. It is the responsibility of each device on the bus to monitor the invitation acknowledge of each invitation to determine when to begin looking for the next start bit. The abbreviated packet is depicted in FIG. 4.

It is not necessary for the arbiter to circulate ID codes that are never utilized. Consequently the arbiter could be programmable to allow some ID codes to be excluded. However, this will not have a large impact on worst case latency. For simplicity, it is sufficient to always cycle through each ID code from 0 to 7.

The problem of loss of synchronization can be dealt with by the following. If, for example, a device falsely detects a start bit then it must be able to re-sync within a brief period of time. For this purpose each bus device should monitor the bus to detect 10 consecutive low bits (called a "break"). Once a break is detected, each device knows that the next '1' that is seen is a start bit. It is for this reason that bit 14 of a data packet is preferably always '1' to ensure that the data packet can never contain 10 consecutive zeroes. The arbiter must insert a break after each set of 8 invitations to cause a re-synchronization.

A full data packet consists of an invitation (start bit followed by an invitation ID), an invitation acknowledge followed by a signal event. A signal event consists of a 4 bit function code followed by a 12 bit data field. The data field can also include an acknowledgment from the start (destination) of the signal event. The following table contains some of the function code definitions that could be used:

| Function Code (4 Bits) | Data Field (12 Bits) |
|---|---|
| Audio Record Sync | 12 bit Time stamp |
| Audio Playback Sync | 12 bit Time stamp |
| Graphics scan line count | 12 bit Line number |

-continued

| Function Code (4 Bits) | Data Field (12 Bits) |
|---|---|
| Video Scan line count | 12 bit Line number |
| Service Request (0 × E) | 10 bit service number<br>1 switch over bit (ignore data)<br>1 bit empty or ack from target device if possible |
| Service complete (0 × F) (always paired with Service request) | 10 bit service number<br>1 bit (not used)<br>1 bit service successful |

A service is a set of operations requested by one device (the source) and performed by another (the target).

A service request is sent by the source device and consists of a 10 bit service number indicating one of 1024 services to be performed, and a 1 bit acknowledge from the target device indicating that the service request was received. It is important that the host CPU 21 allocate unique service numbers to each target so that two request receivers will not accept the same service number. A service complete message should be sent by the receiver of a service request to indicate that it has finished processing the request. It should also return a 1 bit flag indicating that the service was performed successfully or unsuccessfully. The service number it returns should be the same as the service number that it received and acknowledged in the service request. If a service request is received and accepted by a device then it should return a completion message at some later time.

A preferred embodiment of the invention is shown in detailed block diagram as illustrated in FIGS. 5 and 6, which should be assembled together as illustrated in FIG. 7. It should be understood that the various signal variables which will be shown as inputs to the various circuits are obtained from data decoded by bus interface circuits in each of the devices connected to the bus, which recognize the ID signals referred to above, receive packets designated for the circuits, and obtain the variable signals as data in the packets. The interface circuits would be known to a person skilled in the art, and thus will not be described; their designs do not form part of this invention.

Video signals in e.g. RGB or YCrCb models are received or are transmitted (by an I/O interface to a high speed bus connected to memory 1, not shown) to scaler 531.

Scaler circuit 531 receives source signals pixel data via source bus 532 from the memory bus. A destination bus 533 carries an output signal from the scaler to the color conversion unit.

The structure is comprised of an ALU 539 for performing a vertical blend function and an ALU 541 for performing a horizontal blend function. ALU 539 receives the vertical blending coefficients $a_V$ and $b_V$ and the vertical accumulate $A_{ccv}$ flag.

Similarly, the ALU 541 receives from screen memory, via the data portion of the packet described earlier, the horizontal blend coefficients $a_H$ and $b_H$ and the accumulate $A_{ccH}$ flag. The $A_{cc}$ bits determine whether R should be added or zero should be added. $A_{cc}$ is a flag specified in the coefficient list.

ALU 539 receives adjacent pixel data relating to the first or input trajectory on input ports Q and P, the data for the Q port being received via line buffer 543 from the data source, which can be the screen memory, via source bus 532. The output of line buffer 543 is connected to the input of line buffer 545 via multiplexer 562, the output of line buffer 545 being connected to the P port of ALU 539.

The output of ALU 539 is applied to the input of pixel latch 560. The Q pixel data is applied from the output of ALU 539 to the Q input port of ALU 541 and the P pixel data is applied from the output of pixel latch 560 to the P input port of ALU 541. The P pixel data is also applied to the other input of multiplexer 562.

The output of ALU 541 is applied to the input of pixel accumulator 549, which provides an output signal on bus 533 for application to a color conversion unit.

The line buffers are ideally the maximum source line size in length. The accumulator value $A_{ccV}$ and $A_{ccH}$ applied to ALU 539 and ALU 541 respectively determine whether R should be forced to zero or should equal the value in the accumulator.

In operation, a first line of data from a source trajectory is read into line buffer 543. The data of line buffer 543 is transferred to line buffer 545, while a second line of data is transferred from the source trajectory to the line buffer 543. Thus it may be seen that the data at the P and Q ports of ALU 539 represent pixels of two successive vertical lines.

Thus the output of the vertical blend ALU 549 is applied directly to the Q port of the horizontal blend ALU 541, and the output of vertical blend ALU 539 is also applied through a pixel latch 560 to the P port of ALU 541. The output of line buffer 543 is connected to the input of a multiplexer 562; the output of pixel latch 560 is connected to another input of multiplexer 562. The $A_{ccv}$ input is connected to the control input of multiplexer 562. The output of multiplexer 562 is connected to the input of line buffer 545.

The vertical blend ALU 539 can only accumulate into the line buffer 545. The blend equation becomes $$\frac{a_v P + B_v Q}{16} \rightarrow p$$

wherein the result of the equation is assigned back to P if a vertical accumulate is desired.

For the rest of each horizontal line the data relating to two consecutive horizontal pixels are applied on input lines Q and P to ALU 541 and are blended in accordance with the equation $$\frac{a_E P + b_E Q}{16} + R \rightarrow R$$

The result of this equation is output from ALU 541 and is stored in pixel accumulator 549.

The pixel data is transferred from line buffer 543 into line buffer 545. The source trajectory is read and transferred to line buffer 543. The steps described above for the vertical blending function is repeated for the rest of the image.

Coefficient generation in the vertical direction should be modified accordingly. Line buffer 545 is otherwise loaded whereby line buffer 543 data is transferred to it only when the source Y increment bit is set.

Smaller line buffer sizes, i.e. only 32 pixels strains the maximum source width, but has no effect on source height. Thus if the source width is greater than 32 pixels, the operation can be sub-divided into strips of less than 32 pixels wide. Since this may affect blending, the boundaries of these divisions should only occur after the destination has been written out (i.e. a horizontal destination increment). With a maximum stretch/reduce ratio of 16:1, the boundary thus lands between 16 and 32 pixels in the X direction. The coefficients at the boundary conditions should be modified accordingly.

In a successful prototype of the invention 32 pixel line buffers and a 128 element X coefficient cache were used. Y coefficients are not cached and were read on-the-fly. The embodiment is preferably pipelined, i.e. each block may proceed as soon as sufficient data is available.

It should be noted that the source trajectory should only increment with a source increment that is set in a coefficient list in the screen memory or equivalent. If the source is incremented in the X direction and not in the Y direction and the end of the source line is reached, the source pointer is preferred to be reset to the beginning of the current line. If the source is incrementing in both directions and the end of the source line is reached, it is preferred that the source pointer should be set to the beginning of the next line.

The destination trajectory should be incremented in a similar fashion as the source trajectory except that the destination increment bits of the coefficient list should be used.

Line buffer pointers should be incremented when the source increment bit is set in the X direction. They should be reset to zero when the end of the source line is reached. Data should not be written to line buffer 543 nor transferred to line buffer 545 if the source increment bit is not set in the Y direction. Destination data should only be written out from the pixel accumulator if both X and Y destination increments bits are set.

The X coefficient pointer in the screen memory should be incremented for each horizontal pixel operation, and the Y coefficient pointer should be incremented for each line operation.

The design described above which performs the vertical pixel blending prior to the horizontal pixel blending is arbitrary, and may be reversed in which horizontal blending is performed prior to vertical blending. It should be noted that blending in only one direction can be implemented, whereby one of the ALUs is provided with coefficients which provide unitary transformation, i.e. neither expansion nor contraction of the image.

In a successful prototype of the invention 532 pixel line buffers and a 128 element X coefficient cache were used. Y coefficients are not cached and were read on-the-fly.

The output of pixel accumulator 549 is applied via bus 533 to the input of a color space converter. This signal is typically comprised of three input signal components AinBinCin. The input signals are applied to clippers 417, 418 and 419 respectively.

Also applied to each of the clippers 417, 418 and 419 are ceiling and floor limit data signals or values which establish ranges within which the input signal components should be contained.

When the input signals exceed, either positively or negatively, the limits designated by the ceiling or floor values, the respective signal component is saturated (clipped) to the ceiling or floor (upward or downward limit) respectively.

The output signals of the clippers are applied to respective inputs of a matrix multiplier 421, in the preferred embodiment a [3×3]×[3×1] matrix multiplier. Also input to the multiplier is an array 423 of parameter data which forms a color transformation matrix. The transformation performed in the matrix multiplier will be described below.

The three outputs of the matrix multiplier 421 are applied to three inputs of a vector adder 425. A 3×1 array 427 of parameters is input to vector adder 425, which performs the function [3×1]+[3×1], as will be described below. The parameters 0x in the array 427 constitute offset vectors.

The three outputs of vector adder 425 are applied to respectively inputs of output clippers 429, 430 and 431 to which ceiling and floor limit data signals are applied. The output clippers operate similarly to the input clippers 417, 418 and 419, ensuring that the output signal components are contained within the range defined by the output ceiling and floor limits, and if the output signal components exceed those limits, they are clipped (saturated) to the ceiling and floor levels. The resulting output signals from clippers 429, 430 and 431, designated by $A_{out}$, $B_{out}$, and $C_{out}$ constitute the three components of the output signal in either RGB or YCrCb format.

In a preferred embodiment, each of the R, G and B signals are equal or greater to zero and equal or smaller than 255 units, the Y component is equal to or larger than 16 and equal or smaller than 235, and the Cr and Cb components are equal to or larger than 16, or equal to or smaller than 240.

To convert from YCrCb to RGB, the matrix multiplier 21 and vector adder 425 should perform the following transformation:

$$R=1.1636*(Y-16)+1.6029*(Cr-128)$$

$$G=1.1636*(Y-16)-0.8165(Cr-128)-0.3935(Cb-128)$$

$$B=1.1636*(Y-16)+2.0261(Cb-128)$$

To convert from RGB to YCrCb format, the multiplier and adder should perform the following transformations:

$$Y=+0.2570R+0.5045G+0.0980B+16$$

$$Cr=0.4373R-0.3662G-0.0711B+128$$

$$Cb=-0.1476R-0.2897G+0.4373B+128$$

For brightness, contrast, color saturation and hue control for a YCrCb signal, the input signal is YCrCb and the output is YCrCb, and the following transformations should be performed in the matrix multiplier and adder:

$$Y=Yin*Contrast+Brightness$$

$$Cr=color_sat*(\cos(hue)*(Crin-128)+\sin(hue)*(Cb_in-128))+128$$

$$Cb=color_sat*(-\sin(hue)*(Cr_in128)+\cos(hue)*(Cb_in-128))+128$$

The conversion from a YCrCb to a RGB signal can be expressed in the following matrix form.

$$\begin{matrix} R \\ G \\ B \end{matrix} = \begin{bmatrix} 1.1636 & 1.6029 & 0.0000 \\ 1.1636 & -0.8165 & -0.3939 \\ 1.1636 & 0.0000 & 2.0261 \end{bmatrix} \begin{matrix} Y \\ Cr \\ Cb \end{matrix} + \begin{bmatrix} -223.8 \\ 136.3 \\ -278.0 \end{bmatrix}$$

or more precisely $$RGB=W_{y\rightarrow r}YCrCb+O_{y\rightarrow r}$$

where W is the color transformation matrix and O is the offset vector.

The matrix multiplication step is performed in the matrix multiplier 421 and the addition step is performed in the vector adder 425. The RGB elements constitute the values of the signal components in the input signal, and the numerical parameters in the b 3×3matrix constitute the $W_x$ transformation parameters, while the values in the 3×1 matrix constitute the offset vector O.

For conversion from an RGB to YCrCb format, the transformation that should be performed in the matrix multiplier and vector added is $$\begin{bmatrix} Y \\ Cr \\ Cb \end{bmatrix} = \begin{bmatrix} 0.2570 & 0.5045 & 0.0980 \\ 0.4373 & -0.3662 & -0.0711 \\ -0.1476 & {}_{\tau}0.2897 & 0.4373 \end{bmatrix} \begin{bmatrix} R \\ G \\ B \end{bmatrix} + \begin{bmatrix} 16 \\ 128 \\ 128 \end{bmatrix}$$

or more concisely $$YCrCb = W_{r \to y} RGB + O_{r \to y}$$

For brightness, contrast, color saturation and hue control in a YCrCb type signal, the input signal is YCrCb and the output signal is YCrCb. The matrix multiplier and vector adder should perform the following transformation.

$$Y_{out}$$

$$Cr_{out} =$$

$$Cr_{out} = \begin{bmatrix} \text{Contrast} & 0.0000 & 0.0000 \\ 0.0000 & \text{color_sat} * \cos(\text{hue}) & \text{color_sat} * \sin(\text{hue}) \\ 0.0000 & -\text{color_sat} * \sin(\text{hue}) & -\text{color_sat} * \cos(\text{hue}) \end{bmatrix} \begin{bmatrix} Y_{in} \\ Cr_{in} \\ Cb_{in} \end{bmatrix} + \begin{bmatrix} \text{Brightness} \\ 128 * (1 - \text{color_sat} * (\cos(\text{hue}) + \text{in}(\text{hue}))) \\ 128 * (1 - \text{color_sat} * (\cos(\text{hue}) - \sin(\text{hue}))) \end{bmatrix}$$

In summary, for brightness, contrast, color saturation and hue control when converting from a YCrCb format to RGB, the transformation can be reduced to $$RGB = W_{y>r} * (W_{y>y} * YCrCb + O_{y>y}) + O_{y>r}$$

For brightness, contrast, color saturation and hue control when converting from an RGB signal to a YCrCb type signal, the following reduced transformation is performed.

$$YCrCb = W_{y>y} * (W_{r>y} * RGB + O_{r>y}) + O_{y>y}$$

For performing brightness, contrast, color saturation and hue control in an RGB signal, both the input and output signals are in RGB format. The transformation performed in the multiplier and vector adder in reduced form is $$RGB_{out} = W_{y>r} * (W_{y>y} \cdot (W_{r>y} * RGB_{in} + O_{r>y}) + O_{y>y}) + O_{y>r}$$

As noted above, the clippers 417 to 419 and 429–431 ensure that all data passing through them must be within the ranges specified. However if the input data is already between the specified ranges, the clippers may be deleted.

The three outputs of the matrix multiplier are respectively:

$Aino = Ain * W_{11} + Bin * W_{21} + Cin * W_{31}$ $Bino = Ain * W_{12} + Bin * W_{22} + Cin * W_{32}$ $Cino = Ain * W_{13} + Bin * W_{23} + Cin * W_{33}$ The three outputs of the vector adder are $Aouto = Aouti + O_1$ $Bouto = Bouti + O_2$ $Couto = Couti + O_3$ All arithmetic is preferably performed on 10 bit wide signed integer data (1 bit sign, 1 bit integer and 8 bits fractional). This should be used under normal circumstances. However if over saturation, over contrast, or over brightness is desired, more integer bits may be rquired, increasing the number of total data bits and widening all other data paths. Floor and ceiling parameters on incoming and outgoing data channels are preferably 8 bits wide, and all other data paths are preferably 10 bits wide.

Preferred integer parameter sets for each respective operation are listed below. The dynamic range of Cr and Cb have been adjusted slightly such that all coefficients fall in the range [−512,+512). For YCrCb to RGB conversion:

$$W_{yop} = \begin{bmatrix} 298/256 & 404/256 & 0 \\ 298/256 & -206/256 & -99/256 \\ 298/256 & 0 & 511/256 \end{bmatrix}$$

$$O_{yop} = \begin{bmatrix} -220 \\ +136 \\ -278 \end{bmatrix}$$

The floor and ceiling parameters for the clipping registers preferably are:

| | |
|---|---|
| A_in_ceil | 234 |
| A_in_floor | 16 |
| B_in_ceil | 240 |
| B_in_floor | 16 |
| C_in_ceil | 240 |
| C_in_floor | 16 |
| A_out_ceil | 255 |
| A_out_floor | 0 |
| B_out_ceil | 255 |
| B_out_floor | 0 |
| C_out_ceil | 255 |
| C_out_floor | 0 |

For RGB to YCrCb conversion:

$$W_{poy} = \begin{bmatrix} 66/256 & 129/256 & 25/256 \\ 114/256 & -95/256 & -18/256 \\ -38/256 & -75/256 & 114/256 \end{bmatrix}$$

$$O_{yop} = \begin{bmatrix} 16 \\ 128 \\ 128 \end{bmatrix}$$

The floor and ceiling parameters for the clipping registers preferably are:

| | |
|---|---|
| A_in_ceil | 255 |
| A_in_floor | 0 |
| B_in_ceil | 255 |
| B_in_floor | 0 |
| C_in_ceil | 255 |
| C_in_floor | 0 |
| A_out_ceil | 235 |
| A_out_floor | 16 |
| B_out_ceil | 240 |
| B_out_floor | 16 |
| C_out_ceil | 240 |
| C_out_floor | 16 |

For brightness, contrast, color saturation and hue control of YCrCb=>YCrCb:

$$W_{yop} = \begin{vmatrix} \text{Contrast} & 0 & 0 \\ 0 & \text{color_sat} * \cos(\text{hue}) & \text{color_sat} * \sin(\text{hue}) \\ 0 & -\text{color_sat} * \sin(\text{hue}) & +\text{color_sat} * \cos(\text{hue}) \end{vmatrix}$$

$$O_{yop} = \begin{vmatrix} \text{Brightness} \\ 128 * (1 - \text{color_sat}(\cos(\text{hue}) + \sin(\text{hue}))) \\ 128 * (1 - \text{color_sat}(\cos(\text{hue}) - \sin(\text{hue}))) \end{vmatrix}$$

The floor and ceiling parameters for the clipping registers preferably are:

| | |
|---|---|
| A_in_ceil | 235 |
| A_in_floor | 16 |
| B_in_ceil | 240 |
| B_in_floor | 16 |
| C_in_ceil | 240 |
| C_in_floor | 16 |
| A_out_ceil | 235 |
| A_out_floor | 16 |
| B_out_ceil | 240 |
| B_out_floor | 16 |
| C_out_ceil | 240 |
| C_out_floor | 16 |

For brightness, contrast, color saturation and hue control of YCrCb=>RGB:

$$W=W_{y>r}*W_{y>y}$$

$$O=W_{y>r}*O_{y>y}+O_{y>r}$$

The clipping registers are set as with straight YCrCB to RGB conversion.

For brightness, contrast, color saturation and hue control of RGB=>YCrCb:

$$W=W_{y>y}*W_{r>y}$$

$$O=W_{y>y}*O_{r>y}+O_{y>y}$$

Clipping registers are set as with straight RGB to YCrCb conversion.

For brightness, contrast, color saturation and hue control in RGB=>RGB:

$$W=W_{y>r}*W_{y>y}*W_{r>y}$$

$$O=W_{y>r}*(W_{y>y}*O_{r>y}+O_{y>y})+O_{y>r}$$

The floor and ceiling parameters for the clipping registers preferably are:

| | |
|---|---|
| A_in_ceil | 255 |
| A_in_floor | 0 |
| B_in_ceil | 255 |
| B_in_floor | 0 |
| C_in_ceil | 255 |
| C_in_floor | 0 |
| A_out_ceil | 235 |
| A_out_floor | 0 |
| B_out_ceil | 255 |
| B_out_floor | 0 |
| C_out_ceil | 255 |
| C_out_floor | 0 |

It is preferred that all matrix multiplications should be performed in floating point and only converted to integer just before loading the coefficients to the hardware color conversion unit. This minimizes transformation error.

It should be noted that the input clipping parameters and output clipping parameters are preferably programmable. Thus any three component number set may be transformed into any other three component set as long as that transformation is linear. In particular, any three component color model may be transformed to any other three component color model as long as that transformation is linear. If the multipliers and data paths were widened, it would be practical to perform other useful transformations, such as xyz coordinate transformation for example.

The output of the color space conversion circuit is input to an output multiplexer 620. Source data is data relating to a video or graphical signal which is to be mixed with destination pixel data (or in short, simply destination data). Destination data is data already in the memory 1 which is to be displayed, and can result from another source such as a video input, in a manner known in the art.

It is preferred that the source data should be passed through an output masking gate 623. The output masking gate 623 should be always enabled, although it may be set such that it does not mask anything.

The output multiplexer 620 has a control input 621 to which a keying signal is applied. Thus depending on the value of the keying signal, a pixel of either destination data or source data is provided at the output 622 of the multiplexer 620. Data at the output 622 is written to the destination memory, which can be a destination register or the memory 1.

The destination and source data is also provided to inputs of an input multiplexer 624. A mode signal applied to a control input 625 of multiplexer 624 selects which of the signals, a pixel of either destination or source, will be provided at its output, from which the keying signal, if provided for that pixel, will be derived. The mode signal can be a bit provided to the mixing unit from a control register of the display processor.

Various components of data defining each pixel (7:0, 15:8, 23:16 and/or 31:24) are then individually passed through respective gates 627, 628, 629 and 630, each of which receives 8 mask bits INASK from a control register of the display processor. This provides a means to mask off bits which will not participate in generating the keying signal, and thus to inhibit keying. OMASK and IMASK are preferably 32 bits wide, corresponding to the four 8 bit pixel components that are being operated upon. Since each of the components of data can define a particular characteristic of the pixel, e.g. color, embedded data, exact data, etc., this provides a means to inhibit or enable keying on one of those characteristics, or by using several of the components and masking switches, to inhibit or enable keying based on a range of colors, embedded data, etc.

The outputs of each of the gates 627, 628, 629, 630 is applied to one input of each of pairs of comparators 633A and 633B, 634A and 634B, 635A and 635B, and 636A and 636B. Data values A and B are applied via masking gates 638A and 638B, 639A and 639B, 640A and 640B, and 641A and 641B respectively to the corresponding respective inputs of the comparators 633A–636B. The same masking bits IMASK that are applied to the gates 627–630 are applied to the respective corresponding gates 638A–641B. The data values A and B are static, and are masked by the gates in a similar manner as the destination or source data. Compare function selection signals FNA1, FNB1; FNA2, FNB2; . . . —FNB4 are applied to select the compare function of the corresponding gates 633A–636B.

Each pair of comparators compares each 8 bit pixel component with two values, the respective masked pixel components from value A and from value B. Each component has a separate compare function with each of the two comparison values.

The result of all of the component comparisons with the A value are ANDed together in AND gate 643, and the result of all of the component comparisons with the B value are ANDed together in AND gate 645. The outputs of AND gates 643 and 645 are applied to logic circuit 647. A CSelect bit from a control register of the memory 1 is applied to a control input of logic circuit 647, to determine whether the results output from AND gates 643 and 645 should be ANDed or ORed together.

The output of logic circuit 647 is the keying signal. It is applied to control input 621 of the output multiplexer, preferably through inverter 649. A signal ISelect applied from a control register of the memory 1 processor to a control input of inverter 649 determines whether the keying signal should be inverter or not. This provides means to inverse key on the data, e.g. to instantly switch the other of the destination or source data as the keyed data into or around a keying boundary merely by implementing a 1 bit software switch command ISelect.

Thus if the key signal data is FALSE, destination data is output from multiplexer 620. If the key signal is TRUE, the source data is masked with the output mask 623 and written to the destination.

The state of the mixing unit can be programmed by the following configuration, which can be stored in control or configuration registers:

| Register Name | Number of Bits | Description |
|---|---|---|
| Mode | 1 | Selects either the source or destination for comparison. |
| CSelect | 1 | Selects AND or OR the results of the A and B comparisons. |
| ISelect | 1 | Sects INVERT or no operation. |
| ValueA | 32 | Value A to compare. |
| ValueB | 32 | Value B to compare. |
| IMask | 32 | Input mask for masking off bits which will not participate in the comparison. |
| OMask | 32 | Output mask for preventing bits from being overwritten at the destination. |
| FNA1 | 3 | Compare function for pixel component 1 and value A. |
| FNA2 | 3 | Compare function for pixel component 2 and value A. |
| FNA3 | 3 | Compare function for pixel component 3 and value A. |
| FNA4 | 3 | Compare function for pixel component 4 and value A. |
| FNB1 | 3 | Compare function for pixel component 1 and value B. |
| FNB2 | 3 | Compare function for pixel component 2 and value B. |
| FNB3 | 3 | Compare function for pixel component 3 and value B. |
| FNB4 | 3 | Compare function for pixel component 4 and value B. |

The eight possible comparison functions are the following:

| Function Number | Description |
|---|---|
| 000 | False |
| 001 | True |
| 010 | Data >= Value |
| 011 | Data < Value |
| 100 | DataI = Value |
| 101 | Data == Value |
| 110 | Data <= Value |
| 111 | Data > Value |

In the embodiment illustrated, four groups of bits, bits 0–7, bits 8–15, bits 16–23, and bits 24–31, defining four components of a single pixel, are separately processed, giving a very high degree of flexibility in keying. These four components can define the red, green and blue (RGB) color of a picture or can be each of the Y,U,V parameters for that type of picture. The fourth component is provided for in case a destination compare operation is desired to be performed. This fourth component is referred to as the alpha channel, and is usable by the application software.

However it will be noted that in some cases four, or three (if the alpha channel is not used), components need not be used. In a simpler system, such as a monochrome system, or in a system in which a color signal is to be processed by the use of only one component, only one mask 627, one pair of comparators 633A and 633B, and one pair of masks 638A and 638B can be used. AND gates 643 and 645 can then be dispensed with and the outputs of comparators 633A and 633B can be applied directly to inputs of logic circuit 647.

FIG. 8 illustrates the type of result that use of the present invention can provide. A full screen graphic screen 651 can contain multiple overlapping full motion video streams Video 1, Video 2, and Video 3.

The live video windows may be partially obsured by other windows. To deal with odd clip regions, the program application software should assign an ID to each of the distinct regions: graphics, Video 1, Video 2, and Video 3. This ID should then be written to the alpha channel of each pixel in the destination. Each video source should then be keyed to its own ID using the mixing unit described above, so that writing is inhibited outside it's own region.

To implement this, and assuming that the alpha channel has been set up (channel 4, bits 0–7), the data provided from the control registers to the various control inputs described above, i.e. one possible video mixer configuration can be:

| Register | Value |
|---|---|
| Mode | DESTINATION |
| CSelect | OR |
| ISelect | No operation |
| ValueA | REGION_ID |
| ValueB | don't care |
| IMask | 000000FF |
| OMask | FFFFFF00 |
| FNA1 | TRUE |
| FNA2 | TRUE |
| FNA3 | TRUE |
| FNA4 | Data == ValueA |
| FNB1 | FALSE |
| FNB2 | FALSE |
| FNB3 | FALSE |
| FNB4 | FALSE |

A possible video mixer configuration to mix two video streams, one of which is blue screened to provide for video special effects) is as follows. The non-blue screened source may also be a computer generated background.

| Register | Value |
|---|---|
| Mode | Blue-screened data is SOURCE |
| CSelect | AND |
| ISelect | INVERT |
| ValueA | Lower color bound |
| ValueB | Upper color bound |
| IMask | FFFFFF00 |
| OMask | FFFFFF00 |
| FNA1 | Data > ValueA |
| FNA2 | Data > ValueA |
| FNA3 | Data > ValueA |
| FNA4 | TRUE |
| FNB1 | Data < ValueB |
| FNB2 | Data < ValueB |
| FNB3 | Data < ValueB |
| FNB4 | TRUE |
| Mode | Blue-screened data is |

-continued

| Register | Value |
|---|---|
| | DESTINATION |
| CSelect | AND |
| ISelect | No operation |
| ValueA | Lower color bound |
| ValueB | Upper color bound |
| IMask | FFFFFF00 |
| OMask | FFFFFF00 |
| FNA1 | Data > ValueA |
| FNA2 | Data > ValueA |
| FNA3 | Data > ValueA |
| FNA4 | TRUE |
| FNB1 | Data < ValueB |
| FNB2 | Data < ValueB |
| FNB3 | Data < ValueB |
| FNB4 | TRUE |

To overlay computer graphics or text on top of a video stream or graphical image, the following possible video mixer configuration can be used. It should be noted that this is similar to blue screening, except that the computer graphics signal is used to key on a specific color.

| Register | Value |
|---|---|
| Mode | Graphics data is SOURCE |
| CSelect | OR |
| ISelect | INVERT |
| ValueA | Color Key |
| ValueB | Don't care |
| IMask | FFFFFF00 |
| OMask | FFFFFF00 |
| FNA1 | Data == ValueA |
| FNA2 | Data == ValueA |
| FNA3 | Data == ValueA |
| FNA4 | TRUE |
| FNB1 | TRUE |
| FNB2 | TRUE |
| FNB3 | TRUE |
| FNB4 | TRUE |
| Mode | Graphics data is DESTINATION |
| CSelect | OR |
| ISelect | NO operation |
| ValueA | Color Key |
| ValueB | Don't care |
| IMask | FFFFFF00 |
| OMask | FFFFFF00 |
| FNA1 | Data == ValueA |
| FNA2 | Data == ValueA |
| FNA3 | Data == ValueA |
| FNA4 | TRUE |
| FNB1 | TRUE |
| FNB2 | TRUE |
| FNB3 | TRUE |
| FNB4 | TRUE |

A person skilled in the art understanding this invention may now design variations or other embodiments, using the principles described herein. All such variations or embodiments are considered to fall within the scope of the claims appended hereto.

We claim:

1. A video display processor comprising:

(a) means for receiving digital input signal components of a signal to be displayed;

(b) means for converting said components to a desired format, (c) means for scaling and blending said [signals] *components* in said desired format, (d) means for outputting said scaled and blended signals for display or further processing, and (e) an arbiter and local timing means for operating and controlling all of said (a), (b), (c) and (d) means substantially independently of a host CPU.

2. A processor as defined in claim 1 further including a video mixer for receiving said scaled and blended signals as processed source signals and for receiving destination data signals in said desired format, a multiplexer for multiplexing said source and data signals and for providing a multiplexed output signal therefrom for display or further processing.

3. A processor as defined in claim 2 in which said receiving means is comprised of a line buffer for receiving said components from a video memory, in which said output signals are stored in an output buffer, and further comprising a control bus connected to the buffer, the converting means, the scaling and blending means, the video mixer and the multiplexer for carrying signals from the arbiter for controlling timing thereof.

4. A processor as defined in claim 3 wherein said video memory further stores source signals and provides them as said input signal components, stores said destination signals, and stores and provides control signals for defining required operations of at least one of said scaling and blending means, components converting means and multiplexing means.

5. A processor as defined in claim 4 including an address generating means for receiving said control signals and for generating address signals under further control of arbitration signals received from the arbiter for addressing and enabling timely operation of said converting means, scaling and blending means, video mixer and multiplexer via said control bus.

*6. A method operating in a computer for combining a first image in a first format with a second image in a second format without requiring substantial involvement of a host central processing unit of the computer, the method comprising the steps of:*

*receiving said first image at a video display processor;*

*scaling and blending, by said video display processor, said first image to a desired size to produce a scaled image;*

*converting said scaled image, by said video display processor, to said second format to produce a converted image;*

*combining said converted image with said second image; and*

*providing control, by said video display processor, for said scaling and blending, said converting and said combining steps so that said converted image is combined with said second image without requiring substantial involvement of the host central processing unit of the computer.*

*7. The method of claim 6, wherein said combining step comprises:*

*multiplexing said converted image with said second image.*

* * * * *

UNITED STATES PATENT AND TRADEMARK OFFICE

CERTIFICATE OF CORRECTION

PATENT NO. : RE 38,610 E
DATED : October 5, 2004
INVENTOR(S) : Sanford S. Lum et al.

It is certified that error appears in the above-identified patent and that said Letters Patent is hereby corrected as shown below:

Column 6,
Lines 43-45, "$a_E$" and "$b_E$" should be replaced with -- $a_H$ -- and -- $b_H$ --, respectively.

Column 8,
Line 40, "Crin" should be replaced with -- Cr_in --.
Lines 40-44, "Cr_in128" should be replaced with -- Cr_in - 128 --.

Column 10,
Lines 5 and 10, "$_{yop}$" should be replaced with -- $_{y>r}$ --.
Lines 30-35, "$_{poy}$" and "$_{yop}$" should be replaced with -- $_{r>y}$ -- and -- $_{y>r}$ --, respectively.
Lines 60-65, "$_{yop}$" should be replaced with -- $_{y>r}$ --.

Signed and Sealed this

Twenty-ninth Day of March, 2005

JON W. DUDAS
*Director of the United States Patent and Trademark Office*